Nov. 5, 1929.  A. V. COOPER, SR  1,734,115
EDUCATIONAL DEVICE
Original Filed Sept. 7, 1927  4 Sheets-Sheet 1

Inventor
Arthur V. Cooper, Sr.
By Frank B. Hoffman
Attorney

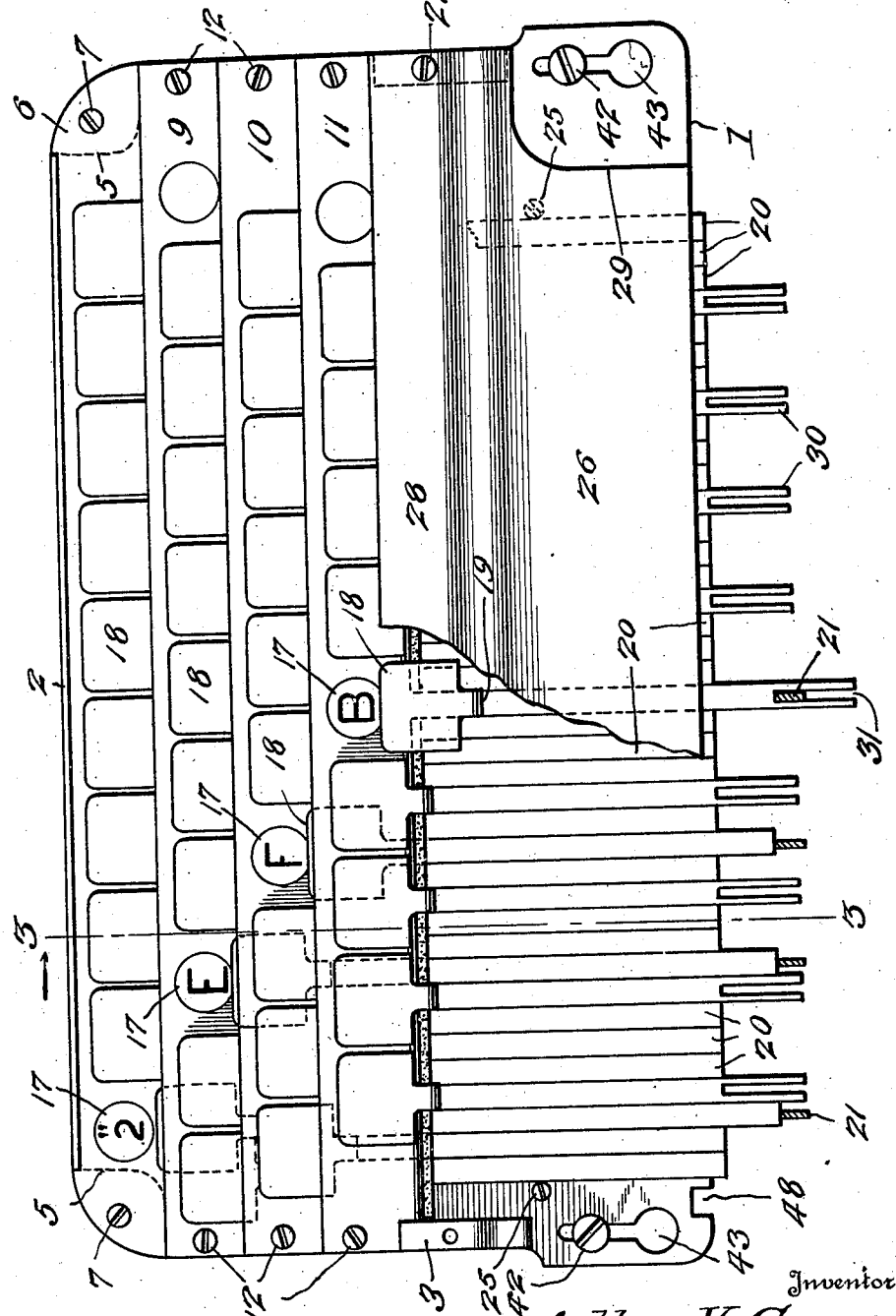

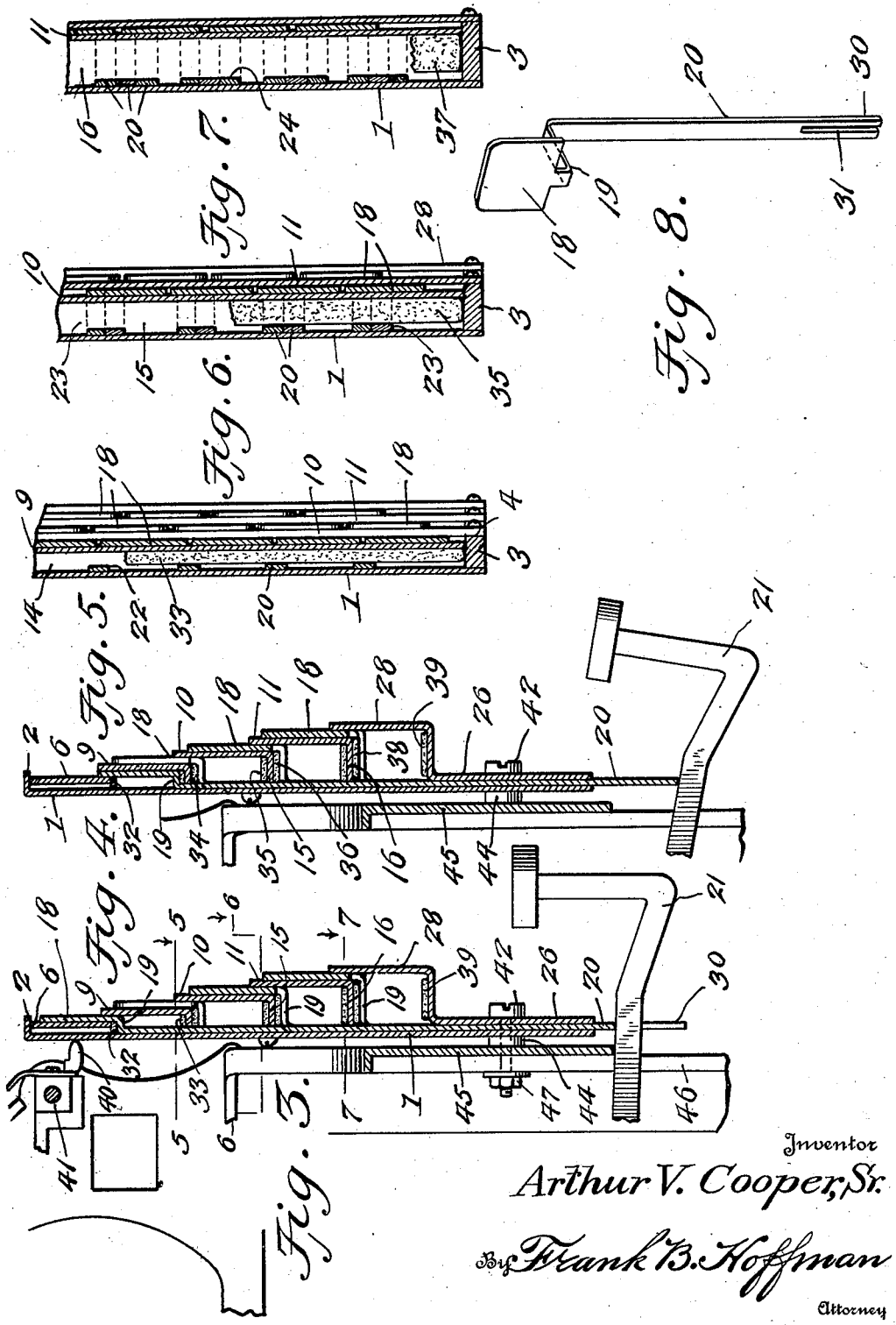

Inventor
Arthur V. Cooper, Sr.
By Frank B. Hoffman
Attorney

Patented Nov. 5, 1929

1,734,115

UNITED STATES PATENT OFFICE

ARTHUR V. COOPER, SR., OF ROME, NEW YORK

EDUCATIONAL DEVICE

Application filed September 7, 1927, Serial No. 218,015. Renewed May 31, 1929.

This invention relates to educational means adapted for use in connection with standard typewriters to enable a person to more readily and quickly learn to operate a typewriter through the utilization of mental panoramic impressions acquired through continuous flash visions of the typewriter characters as they are struck during the operation of the typewriter.

The principal object of my invention is to provide educational means adapted to be so positioned upon a standard typewriter and actuated through the normal operation of the typewriter keys as to produce before the eyes of the student typist a panoramic picture of the keyboard characters and their relative positions, whereby fixed mental character impressions may be more readily and lastingly acquired.

The object of my invention is to provide an educational device adapted to be attached to the front of a standard typewriter embodying a plurality of characters corresponding to and arranged in the same relative position to each other as those of the keyboard of the typewriter, said characters being normally concealed by separate shutters, each of which may be lowered to momentarily reveal the character corresponding to the one upon the particular typewriter key that may be depressed.

The object of my invention is to provide an educational device of the character described adapted to be detachably mounted in such a manner on the front of a standard typewriter that it can be operated through the actuation of the typewriter key bars without in any way interfering with the free use of and the ordinary functioning of the typewriter itself.

A further object of the invention is to provide a device of the character described which is durable, simple, and economical in construction, which may be readily adapted to be applied to a great variety of typewriting machines, which can be operated easily and noiselessly upon the ordinary operation of the typewriter and which will give visual, instantaneous indication of the operation of the various keys of the typewriter keyboard, to produce fixed mental impressions of the characters and their relative positions.

With these and other objects in view, the invention comprises the various novel features of construction, combination and arrangement of parts as will hereinafter more fully appear and be shown in the accompanying drawings.

Referring more particularly to the drawings:

Fig. 2 is a front elevation of the device with part of the lower front plate broken away to show the construction and relative arrangement of the shutter rods.

Fig. 3 is a vertical section taken on the line 3—3 of Fig. 2, showing the device attached to the front of the main frame of the typewriter immediately behind the top or fourth bank of keys with all of the characters on the front of the device concealed from view.

Fig. 4 is a similar view showing one of the keys of the fourth bank depressed, and the corresponding shutter lowered to reveal the character on the front of the device corresponding to the one on the key depressed.

Fig. 5 is a sectional plan view taken on the line 5—5 of Fig. 3, showing the notches in the flange of the front plate in the third bank, holding the rods of the shutters of the fourth or uppermost bank in position.

Fig. 6 is a similar view taken on the line 6—6 of Fig. 3, showing the notches in the flange of the front plate of the second bank holding the rods of the shutters of the fourth and third banks in position.

Fig. 7 is a similar view taken on the line 7—7 of Fig. 3, showing the notches in the flange of the front plate of the first bank holding the rods of the shutters of the fourth, third and second banks in position.

Fig. 8 is a detailed perspective view of one of the shutters and its supporting rod.

Referring more particularly to the drawings, it will be seen that the educational device consists of a main supporting back plate or board 1 of substantially the same width as the keyboard of the typewriting machine to which the device is attached, said back plate being of sufficient height to carry upon its upper portion rows or banks of characters corresponding in number and arrangement to those comprising the usual standard keyboard of the typewriting machine. The upper longitudinal edge of the back plate is provided with a laterally extending cover flange 2.

Figure 1:
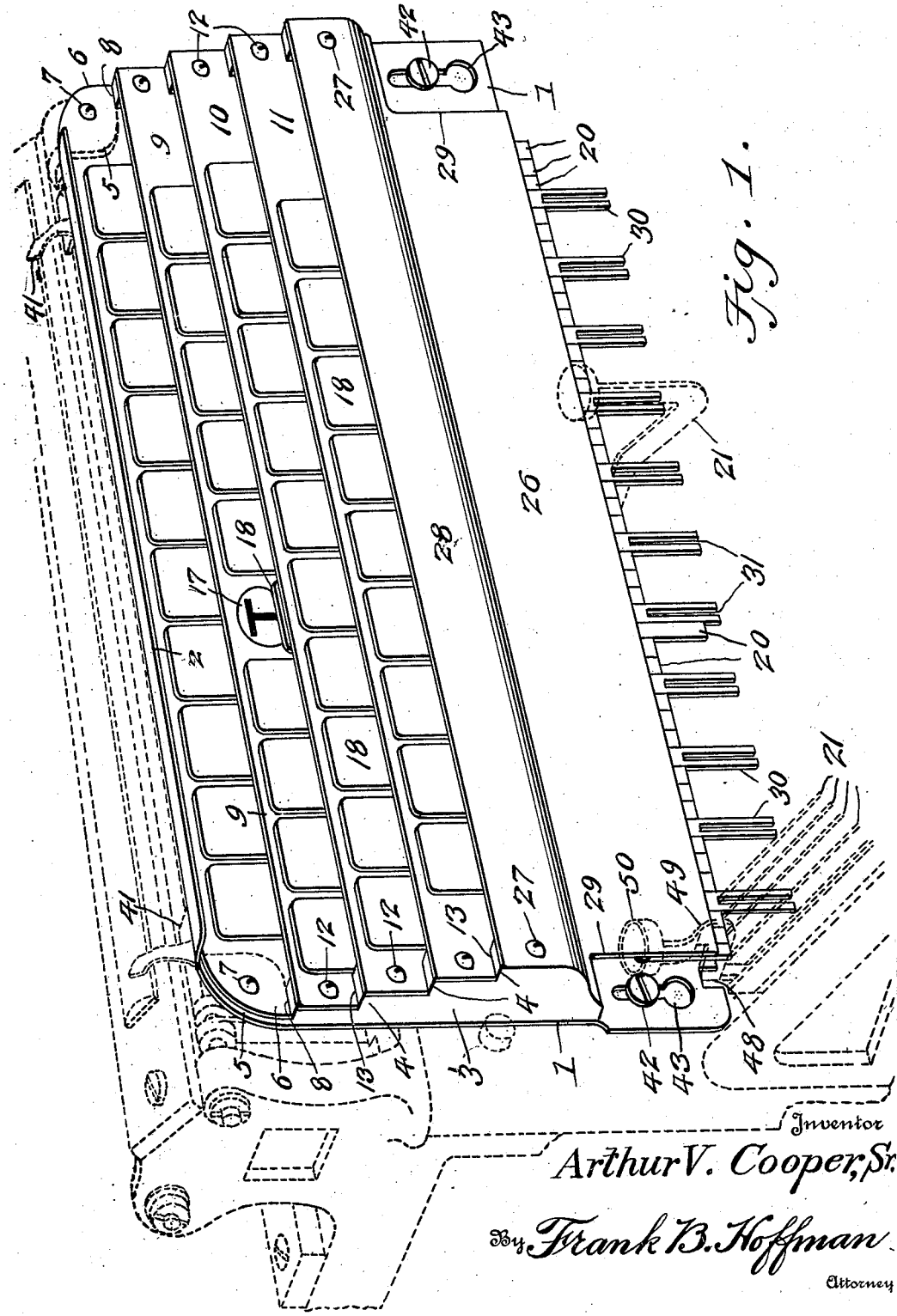
Fig. 1 is a perspective view of my educational device as applied to the front of a standard No. 5 Underwood typewriter, the typewriter being indicated by dotted lines.
Figure 9:
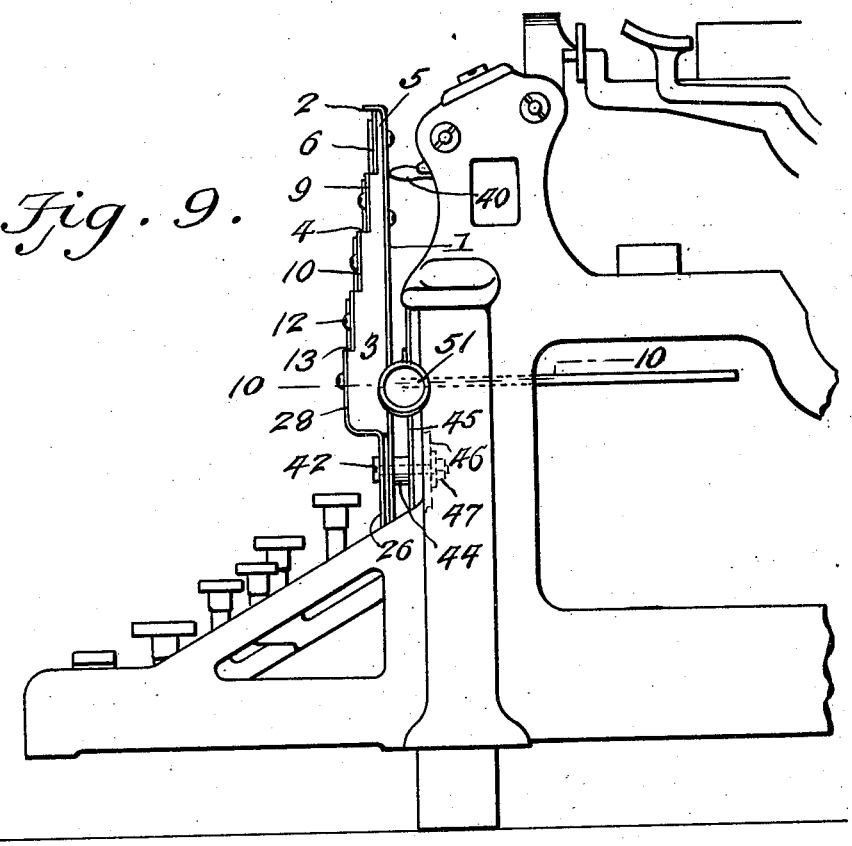
Fig. 9 is an end elevation of the device as applied to the front of a standard Underwood typewriter.

At each opposite side of the back plate 1, there is provided a side bracket 3, formed with a series of offset portions or steps 4, as clearly shown in Figs. 1 and 9. Positioned immediately above each of these side brackets 3 is a spacing member 5, against which is arranged a character supporting strip or bank 6, held in place by screws or other suitable fastening means 7, which pass through the spacing members 5 into the back plate 1. The lower opposite ends of the character supporting strip are cut away to form shoulders 8, which rest on the upper ends of the side brackets 3. The lower longitudinal edge of the character supporting strip, by reason of this cut-away portion, fits down in between the side brackets and is thus securely held in place.

Arranged below the character supporting strip 6, are additional character supporting strips or banks, 9, 10 and 11, each being secured to one of the offset portions or steps 4 of the side brackets 3 by screws or other suitable means 12. The lower opposite ends of each of these character supporting strips are also cut away like the character supporting strip 6 to provide shoulders 13 to rest upon the offset portions 4 of the side brackets 3. The lower longitudinal edges of these strips fit down in between the side brackets 3 and are formed with lateral flanges 14, 15, and 16, extending back against the back plate 1.

The character supporting strips 6, 9, 10 and 11 are preferably formed of sheet metal with circular depressions stamped or otherwise formed therein at spaced intervals on their forward faces to receive character bearing discs 17, so that the front of said discs will be flush with the forward face of the character supporting strips. The discs 17 will preferably be white and of a size corresponding to the key papers universally used on the upper surfaces of the typewriter keys, with the characters preferably printed in black to correspond with those on the keys of a typewriter.

For each character bearing disc 17 there is provided a shutter plate 18 of a size and shape to normally conceal the disc, with its forward surface colored dark, or otherwise painted black. Each shutter is mounted upon the upper offset portion 19 of a relatively narrow flat rod 20, which is slidably mounted in the device as hereinafter described.

The lower end of each shutter rod rests upon and is supported by one of the typewriter keybars 21, corresponding to the character upon the disc 17 normally concealed by the shutter. All of the shutter rods 20 rest and slide against the forward face of the back plate 1, their offset portions 19 extending forwardly just far enough to provide for free vertical movement of the shutters between the adjacent upper and lower character supporting strips. These shutter rods are held in vertical parallel alignment by the laterally extending flanges 14, 15 and 16, the flange 14 being provided with spaced notches 22 in its rear edge to receive the upper portions of the rods of the shutters of the uppermost or fourth bank of characters. The flange 15 is also provided with spaced notches 23 in its rear edge to receive the rods of the shutters of the fourth and third banks of characters. Likewise the flange 16 is provided with spaced notches 24 in its rear edge to receive the rods of the shutters of the fourth, third and second banks of characters. As shown in Fig. 2, all of the shutter rods are loosely arranged in juxtaposition against the back plate 1 for free vertical sliding movement and are held against swinging out of vertical alignment by screws or other guide means 25 carried by the back plate.

Resting upon the lowermost offset portion 4 of the side brackets 3, near the bottom of the first or lowermost character bearing bank 11, is a front plate or shield 26 of the same width as the character supporting strips 9, 10, and 11, and is held in place by screws or other suitable means 27. The upper portion 28 thereof is offset forwardly to form a curtain, back of which the shutters of the first bank descend while the lower opposite ends are cut away as at 29 to afford free and easy access to the means for attaching the back plate to the front of the main frame of the typewriter, as will be presently described. The lower portion of the front plate is spaced from the back plate 1 a distance substantially equal to the thickness of the shutter rods and serves to hold all of the shutter rods in alignment for free sliding vertical movement. This maintaining of the shutter rods in proper aligned position, is particularly important as the rods of the first row of shutters have no notched flange to hold the individual rods nor their upper ends as in the case with the rods of the second, third and fourth rows of shutters. This is, however, compensated for by making the rods of the first or lowermost bank of shutters a little longer than the rest of the shutter rods as indicated by the numeral 30 in Figs. 1 and 2, and by providing them with a slot 31 extending upwardly to a point in transverse alignment with the bottom edges of the other shutter rods, for the reception of the corresponding key bar of the typewriter. As the lower end of every fourth shutter rod or all of the rods of the first or lowermost bank of shutters straddle their corresponding key bars of the typewriter, it will be apparent that they will be held in alignment for vertical sliding movement, and at the same time serve to hold and maintain the intermediate shutter rods in vertical alignment.

In order to make the device noiseless and cushion the upward and downward movements of all of the shutters, I provide a series of felt strips. One of these felt strips 32 is secured to the lower edge of the character supporting strip 6 and another felt strip 33 to the upper portion of the lateral flange 14, each adapted to be respectively engaged by the off-set portion 19 of the shutters of the fourth bank as they are successively lowered and raised. Similar felt strips 34, 35, 36, 37 and 38 are secured to the tops and bottoms of the lateral flanges 14, 15 and 16 of the character supporting strips 9, 10, and 11. A similar felt strip 39 is also secured upon the upper face of the offset portion of the front cover plate 26.

The form of device above described is adapted to be constructed as a unit, for use in connection with an Underwood standard typewriter No. 5, and I desire to have it understood that the device is adapted to be constructed for use in connection with any other form of standard typewriter.

In practice, the device is placed in operative position directly in front of the main frame of the typewriter, so that the uppermost portion thereof rests against the usual finger grips 40 of the marginal stops 41 of the typewriter, so that the lower ends of the shutter rods, will rest upon the typewriter key bars at a point intermediate to the upper row or fourth bank of typewriter keys and the forward face of the main frame of the typewriter. As shown in Fig. 1, all of the shutter rods except those of the shutters comprising the first or lowermost bank, rest on the tops of the key bars, while those of the first bank rest upon the key bars in a straddling position to maintain the other rods in proper position.

The device is attached to the typewriter in this position by screws 42, which extend through keyhole slots 43 in the lower opposite ends of the back plate 1, spacing washers 44, the front cover plate of the typewriter 45, and into the main frame of the typewriter 46. If desired, the screws 42 may extend all the way through the main frame and be provided with nuts 47. The attaching screws 42 are used to replace the two lowermost screws ordinarily used for holding the front cover plate 45 in position, because the latter screws are not quite long enough to securely attach the device. By reason of the keyhole slots, the device may be vertically adjusted to accommodate itself to a proper position on the typewriter. The lower edge of the back plate 1 is also provided with a notch 48 for the reception of the shank 49 of the back spacer 50, said notch being of sufficient depth to allow of the free vertical adjustment of the device.

Figure 10:
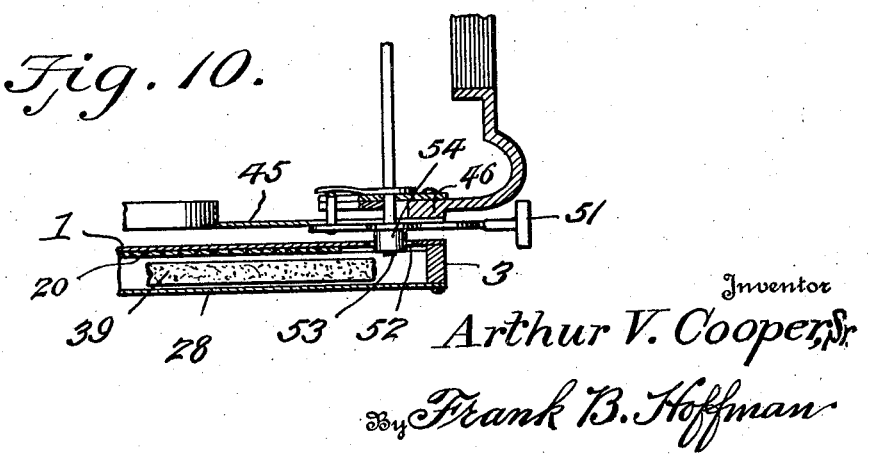
Fig. 10 is a detailed sectional plan view taken on the line 10—10 of Fig. 9.

In order that the device may be arranged in vertical position just described, I find that it is desirable to replace the usual ribbon switch lever by a special form of lever 51, the only difference being that the left hand fingerpiece has been removed to allow the device to be more closely positioned to the front of the typewriter. As will be seen in Fig. 10 the back plate 1 is cut away as at 52 for the reception of the end of the ribbon shaft 53, and the integral bearing boss 54 of the ribbon lever.

From the foregoing it will be noted that in the operation of the device, each shutter is normally supported in position directly in front of its own character disc, through the medium of its corresponding spring tensioned typewriter keybar, so as to conceal the disc from the typist. When a keybar is depressed, the shutter rod and its shutter, will likewise descend under its own weight, so as to reveal the character on the disc corresponding to the key depressed and as soon as the key is released, it will ascend to its normal position through its usual spring tension means and thus elevate the shutter to its normal position to again conceal the character.

As already mentioned, the back ground of the character bearing banks will preferably be black with the character discs white, and the characters thereon black, and also the front surface of the shutters will be black. It will thus be seen that with the shutters in normal raised position, the front of the device will be practically a solid black color, so that when one key is depressed and the shutter for the corresponding character on the device is lowered, there will appear the character disc in white in sharp contrast to the surrounding part of the device and with the character appearing in black upon the white disc. This arrangement not only shows the character sharply, but also shows the white character disc very prominently to the eyes. In rapid manipulation of the typewriting machine, especially if the typist is not watching the typewriter closely, his eye will nevertheless see with distinctness the location of the white discs, even though the eye may not consciously appreciate the character upon the disc. The location of the disc will therefore be distinctly disclosed, that is, whether it is in the upper or lower bank, or either of the intermediate banks, and by reason of its location in the row or bank will clearly indicate the character printed by the machine. There is thus gradually produced in the mind a visual image corresponding to the arrangement of the characters of the keyboard of the typewriter, and at the same time there is built up a fixed mental picture of the entire keyboard and of the location of each character thereon which greatly facilitates the movements of the fingers and arms of the typist.

It will be understood that it is not necessary that the typist constantly watch the device, but the constant reappearance or the flashing of the different characters in their proper position upon the device in sharp contrast with the back ground thereof will be seen enough as it were, from the side of the eye, even when the typist is reading from notes or copying from a book to constantly renew the visual image sensations of the characters so that the mind of the typist will unconsciously lead the fingers and not follow them as is the present case with all beginners learning to typewrite.

In other words, the main purpose of my invention is to provide operators of typewriting machines with an improved mechanical means for quickly acquiring an intense mental image of visualization of the typewriter keyboard through depictions on the flash board of my device of all executed keyboard operations, whereby there will be gradually developed a comprehensive intellectual grasp of the keyboard, thus enabling the typist to utilize the same to more rapidly operate the keyboard.

While I have described the preferred embodiment of my invention, I desire to have it understood that such changes in construction, combination and arrangement of parts and method of operation may be made as are within the scope of the appended claims.

What I claim is:

1. An educational device adapted for use on a typewriter embodying a plurality of characters corresponding to and arranged in the same relative position as those of the keyboard of a typewriter, and shutters normally concealing said characters, said shutters co-acting with and adapted to be actuated through the normal operation of the typewriter keys to successively reveal and conceal said characters.

2. An educational device, adapted to be detachably mounted on a typewriter and embodying a plurality of characters corresponding to and arranged in the same relative position as those of the keyboard of the typewriter, and shutters normally concealing said characters, said shutters co-acting with and adapted to be actuated through the usual operation of the typewriter keys to successively reveal and conceal said characters.

3. An educational device adapted for use on a typewriter embodying a plurality of banks of characters corresponding in number to those on the beyboard of the typewriter, a bank of shutters concealing each bank of characters, the shutters of each bank co-acting with and adapted to be actuated by the typewriter keys of the corresponding typewriter keyboard bank to successively reveal and conceal said characters.

4. An educational device adapted for use on a typewriter comprising a vision board having characters fixed thereon, and a shutter normally concealing each character and movably carried by said vision board, each shutter co-acting with and adapted to be actuated by the key of the typewriter corresponding to the character concealed by the shutter to successively reveal and conceal said characters.

5. An educational device adapted for use on a typewriter comprising rows of stationary characters corresponding to the rows of keys of the typewriter keyboard, and a series of separate shutters, each shutter being normally supported by one of the typewriter keys to conceal the character corresponding to the respective typewriter key and adapted to descend under its own weight, when the typewriter key supporting it is depressed.

6. An educational device adapted for use on a typewriter comprising a vision board having thereon a plurality of transversely arranged rows of character bearing discs corresponding to the respective rows of keys of the typewriter keyboard, and a shutter normally concealing each character bearing disc, each of said shutters adapted to be supported in concealing position by the typewriter key corresponding to the respective character concealed, whereby when the typewriter keys are depressed the shutters will be lowered to disclose the concealed characters and upon release of the typewriter keys, will be automatically raised to concealing position.

7. An educational device adapted to be mounted on the front of a typewriter and comprising a back plate, character bearing strips mounted transversely of said back plate, a shutter normally concealing each character, and a rod for each shutter adapted to rest upon the typewriter keybar corresponding to the respective characters to support said shutters in front of their respective characters, whereby upon depression of any keybar, the corresponding shutter will descend from and disclose the character hidden thereby and upon release of said keybar, will be elevated by the keybar to concealing position.

8. An educational device adapted to be mounted on the front of a typewriter comprising a frame, a plurality of dark banks mounted thereon, spaced white discs with dark characters mounted thereon, said character bearing disks corresponding in arrangement to the keys of the typewriter keyboard, a dark movable shutter normally concealing each disk, a rod for each shutter adapted to rest upon the typewriter keybar corresponding to the respective character disk to support each shutter in concealing position, whereby upon depression of a keybar, the cooperating shutter will be lowered to reveal the character hidden thereby and upon release of the keybar, the latter, through its usual spring actuated mechanism will return to normal position and at the same time elevate the shutter to concealing position.

9. An educational device adapted to be mounted upon the front of a typewriter and comprising a back plate, brackets having stepped offset portions mounted on opposite ends of said back plate, strip members arranged transversely of said back plate on the stepped offset portions of said brackets, a series of spaced character bearing disks carried by each strip member, shutters normally concealing said character bearing disks and arranged for sliding movement between said strip members, a rod for each shutter arranged for sliding movement on said back plate, a cover plate arranged across the lower portions of said shutter rods to maintain them in alignment for sliding movement, the lower ends of said shutter rods being adapted to rest upon the typewriter key bars to support said shutters in front of their respective characters for the purpose set forth.

10. An educational device adapted to be mounted on the front of a typewriter and comprising a vertically disposed frame, a plurality of spaced character bearing disks mounted thereon corresponding in arrangement to the keys of the typewriter keyboard, a vertically movable shutter normally concealing each character bearing disk, a rod for each shutter adapted to rest upon the typewriter keybar corresponding to the character concealed by said shutter, said shutters adapted to be actuated to disclose the characters respectively hidden by them through the actuation of the typewriter keys, means for maintaining said shutters and rods in vertical sliding alignment, and means for cushioning the movements of said shutters.

11. An educational device adapted to be detachably mounted on the front of a typewriter and comprising a main frame having characters arranged thereon corresponding to those of the typewriter keyboard, a shutter normally concealing each character on said frame, said shutters co-acting with and adapted to be actuated by the keybars of the typewriter when the latter are actuated to reveal the characters on said frame, and means for adjusting the device on the front of the typewriter for the purpose set forth.

12. An educational device adapted for use on a typewriter comprising a main frame, means for attaching said frame to the typewriter, a plurality of characters corresponding in number and arrangement to those on the keyboard of the typewriter carried by said frame, and a shutter for each character slidably mounted on said frame and normally concealing said characters, said shutters adapted to co-operate with and be actuated by the keys of the typewriter through their normal operation.

In testimony whereof I affix my signature.
ARTHUR V. COOPER, Sr.